United States Patent [19]

Bauer et al.

[11] 4,335,750

[45] * Jun. 22, 1982

[54] REVERSING VALVE CONSTRUCTION AND PISTON HEAD ASSEMBLY THEREFOR AND METHODS OF MAKING THE SAME

[75] Inventors: Werner R. Bauer; Robert A. Van Fossen, both of Richmond, Va.

[73] Assignee: Robertshaw Controls Company, Richmond, Va.

[ * ] Notice: The portion of the term of this patent subsequent to Jan. 20, 1998, has been disclaimed.

[21] Appl. No.: 149,031

[22] Filed: May 12, 1980

Related U.S. Application Data

[62] Division of Ser. No. 958,029, Nov. 6, 1978, Pat. No. 4,245,670.

[51] Int. Cl.$^3$ .................... F16K 31/122; F16J 9/06
[52] U.S. Cl. .................... 137/625.29; 251/31; 92/194; 277/165; 137/625.43
[58] Field of Search ............ 277/165; 137/625.29; 92/94; 251/31

[56] References Cited

U.S. PATENT DOCUMENTS

| | | | |
|---|---|---|---|
| 2,895,772 | 7/1959 | Chadman et al. | 277/165 |
| 2,935,365 | 5/1960 | Dega | 277/165 |
| 3,032,312 | 5/1962 | Greenawalt | 137/625.29 X |
| 3,056,574 | 10/1962 | Greenawalt | 137/625.29 X |
| 3,147,983 | 9/1964 | Neuman et al. | 277/165 X |
| 3,448,959 | 6/1969 | McHale et al. | 137/625.29 X |
| 3,603,215 | 9/1971 | Leschisin | 92/194 X |

FOREIGN PATENT DOCUMENTS 1110970 7/1961 Fed. Rep. of Germany ........ 251/31

*Primary Examiner*—Arnold Rosenthal
*Attorney, Agent, or Firm*—Candor, Candor & Tassone

[57] ABSTRACT

A reversing valve construction having a housing provided with a movable valve member therein that is interconnected to a piston unit having opposed piston heads that define a main chamber of the housing therebetween. The housing has end portions respectively cooperating with the piston heads to define a pair of opposed control chambers therewith, the end portions respectively having valve seats leading to the control chambers in directions substantially transverse to the direction of movement of the piston unit in the housing. Each piston head has a flexible seal member secured between a front disc member and a backing plate of the respective piston head so that an integral peripheral skirt of that seal member is urged into sliding and sealing engagement with an internal peripheral surface of the housing by an annular resilient O-ring member carried by the respective piston head and radially engaging and urging its respective skirt radially outwardly into the sliding and sealing engagement. Such seal member for each piston head can be adapted to close a valve seat carried by a respective end of the housing.

5 Claims, 9 Drawing Figures

REVERSING VALVE CONSTRUCTION AND PISTON HEAD ASSEMBLY THEREFOR AND METHODS OF MAKING THE SAME

This is a division of application Ser. No. 958,029, filed Nov. 6, 1978, now U.S. Pat. No. 4,245,670 dated Jan. 20, 1981.

BACKGROUND OF THE INVENTION

1. Field of the Invention

This invention relates to an improved reversing valve construction and to an improved piston head assembly for such a reversing valve construction or the like as well as to improved methods of making such a reversing valve construction and such a piston head assembly.

2. Prior Art Statement

It is known to provide a reversing valve construction having a housing means provided with a movable valve member therein that is interconnected to a piston unit disposed in the housing means and having opposed piston heads each of which has a flexible seal member secured between a front disc member and a backing plate of the respective piston head so that an integral peripheral skirt of that seal member is urged into sliding and sealing engagement with an internal peripheral surface of the housing means by a biasing means of a respective piston head.

For example see the following patent:

(1) U.S. Pat. No. 3,056,574—Greenawalt.

It appears that the flexible skirt of the resilient seal member for each piston head of the reversing valve construction of item (1) above is urged radially outwardly by a metallic washer-like spring member.

It is also known to urge an annular flexible boot of a piston head assembly radially outwardly by a flexible O-ring member carried by the piston head assembly.

For example, see the following U.S. Patent:

(2) U.S. Pat. No. 3,448,959—McHale et al.

It appears that a flexible annular tubular boot member is urged radially outwardly by a resilient O-ring member at each piston head assembly of the reversing valve construction of item (2) above.

However, the use of a resilient O-ring member for urging a cup-shaped flexible sealing member radially outwardly into sealing and sliding engagement with the internal peripheral surface of a housing means is well known. For example, see the following U.S. patent:

(3) U.S. Pat. No. 3,603,215—Leschisin

It appears that a flexible cup-shaped seal member of a movable piston head is urged radially outwardly by a resilient O-ring member compressed between the outer peripheral part of the cup-shaped resilient seal member and a rigid backing part of the piston head which clamps the cup-shaped sealing member against another rigid part of the piston head assembly.

It is also known to provide a reversing valve construction having a housing means provided with a movable valve member therein that is interconnected to a piston unit disposed in the housing means having opposed piston heads each of which has a flexible seal member provided with a peripheral skirt disposed in sliding and sealing engagement with the internal peripheral surface of the housing means so as to define a main chamber between the piston heads and a pair of outboard control chambers respectively disposed between the piston heads and opposed ends of the housing means, each piston head having means for closing a valve seat carried by the respective end of the housing means.

For example, see the following U.S. patent:

(4) U.S. Pat. No. 3,032,312—Greenawalt

It appears that each piston head assembly carries a frusto-conical valve member which is inserted into a valve seat carried by the end of the housing means of the reversing valve construction of item (3) above to close the same.

(5) German Pat. No. 1,110,970—Renault.

It appears that certain of the piston head assemblies of item (5) above each has a peripheral skirt on the flexible sealing member of the reversing valve construction that slides in sealing contact with the annular peripheral surface of the housing means containing the same, each sealing member also having a flexible portion for sealing against a respective opposed end wall of the housing means to seal a valve seat structure thereof.

SUMMARY OF THE INVENTION

One feature of this invention is to improve the sealing effect of the piston head assemblies of a piston unit with the housing means of a reversing valve construction receiving the piston unit.

In particular, it is well known that the piston head assemblies are subjected to wear forces during the shifting of the main valve member in a reversing valve construction by the piston unit whereby leakage across the worn piston head assemblies can result.

However, it was found according to the teachings of this invention, than an equal force can be developed against the seal members of the piston head assemblies of a reversing valve construction if resilient O-ring members are utilized as a biasing means therefor.

For example, one embodiment of this invention provides a reversing valve construction having a housing means provided with a movable valve member therein that is interconnected to a piston unit disposed in the housing means and having opposed piston heads that define a main chamber of the housing means therebetween. The housing means has end portions respectively cooperating with the piston heads to define a pair of opposed control chambers therewith, the end portions respectively having valve seats leading to the control chambers in directions substantially transverse to the direction of movement of the piston unit in the housing means. Each piston head has a flexible seal member secured between a front disc member and a backing plate of the respective piston head so that an integral peripheral skirt of that seal member is urged into sliding and sealing engagement with an internal peripheral surface of the housing means by a biasing means of the respective piston head, each biasing means of this invention comprising an annular resilient O-ring member carried by the respective piston head and radially engaging and urging its respective skirt radially outwardly into sliding and sealing engagement with the internal peripheral surface of the housing means. Each seal member of its respective piston head is adapted to close its respective valve seat when moved thereagainst by the piston unit.

It is another feature of this invention to provide improved means for closing the control chamber valve seats of a reversing valve construction with the piston head assemblies of the piston unit thereof.

In particular, it was found according to the teachings of this invention that certain prior known reversing valve constructions utilized separate valve members and separate spring means therefor to be carried by each piston head assembly to close a valve seat at the end of the housing means containing the same when the particular piston unit is moved therein.

However, it was found according to the teachings of this invention that the flexible seal members utilized for sealing against the internal peripheral surface of the housing means can also be utilized as the valve members for closing such valve seats whereby the manufacturing of each piston head assembly can be simplified as the numbers of parts thereof required for closing the valve seat is greatly reduced.

In particular, one embodiment of this invention provides a reversing valve construction having a housing means provided with a movable valve member therein that is interconnected to a piston unit disposed in the housing means and having opposed piston heads each of which has a flexible seal member provided with a peripheral skirt disposed in sliding and sealing engagement with an internal peripheral surface of the housing means so as to define a main chamber between the piston heads and a pair of outboard control chambers respectively between the piston heads and opposed ends of the housing means, each piston head utilizing the seal member thereof for closing a valve seat carried by the respective end of the housing means.

Accordingly, it is an object of this invention to provide an improved reversing valve construction having one or more of the novel features of this invention as set forth above or hereinafter shown or described.

Another object of this invention is to provide an improved method of making such a reversing valve construction or the like, the method of this invention having one or more of the novel features of this invention as set forth above or hereinafter shown or described.

Another object of this invention is to provide an improved piston head assembly for a reversing valve construction or the like, the piston head assembly of this invention having one or more of the novel features of this invention as set forth above or hereinafter shown or described.

Another object of this invention is to provide an improved method of making such a piston head assembly or the like, the method of this invention having one or more of the novel features of this invention as set forth above or hereinafter shown or described.

Other objects, uses and advantages of this invention are apparent from a reading of this invention which proceeds with reference to the accompanying drawings forming a part thereof and wherein:

DESCRIPTION OF THE PREFERRED EMBODIMENTS

Figure 1:
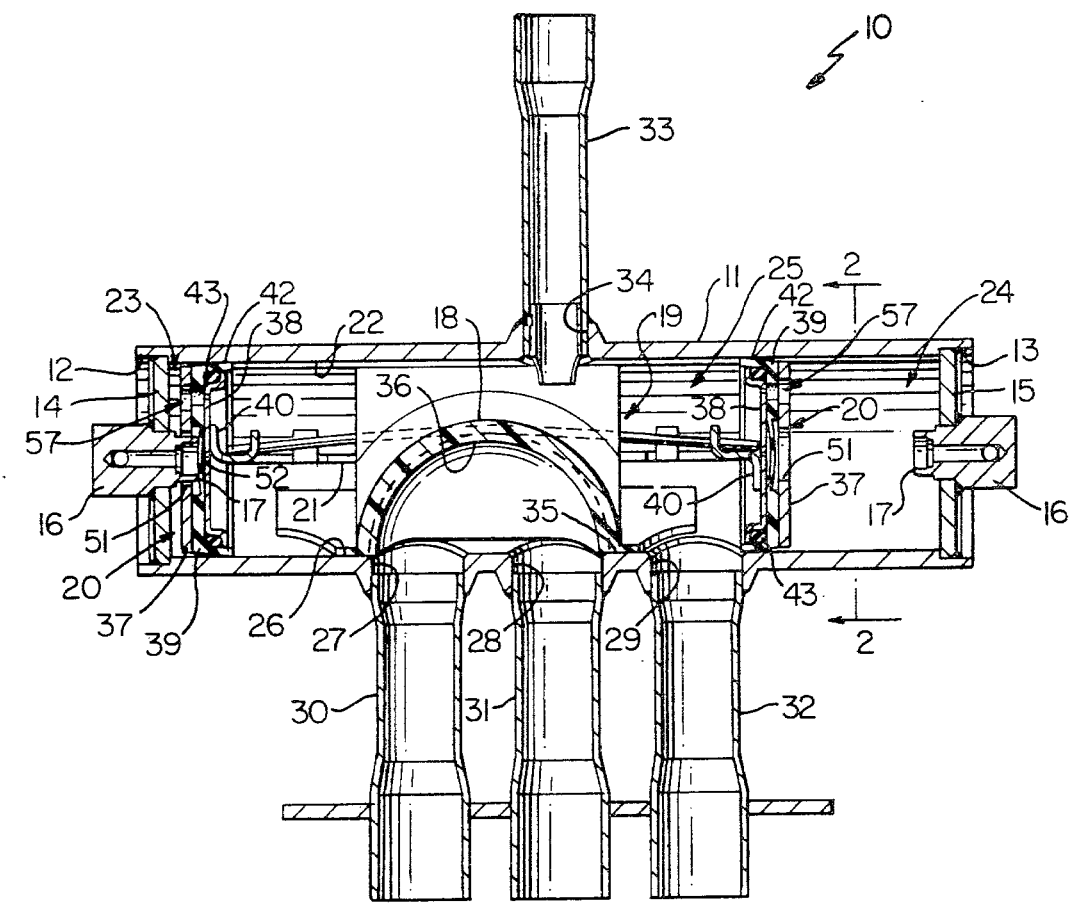
FIG. 1 is a cross-sectional view illustrating one embodiment of the improved reversing valve construction of this invention.
Figure 2:
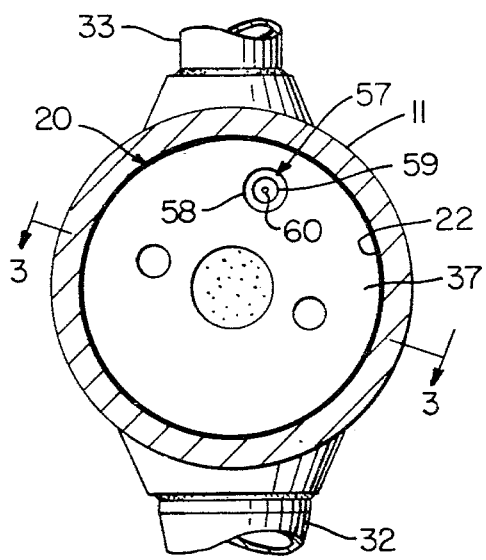
FIG. 2 is an enlarged, fragmentary, cross-sectional view taken on line 2—2 of FIG. 1.

While the various features of this invention are hereinafter described and illustrated as being particularly adapted to provide a reversing valve construction for a heat pump system, it is to be understood that the various features of this invention can be utilized singly or in any combination thereof to provide a reversing valve construction for other systems as desired.

Therefore, this invention is not to be limited to only the embodiments illustrated in the drawings, because the drawings are merely utilized to illustrate one of the wide variety of uses of this invention.

Referring now to FIG. 1, an improved reversing valve construction of this invention is generally indicated by the reference numeral 10 and comprises a cylindrical tubular housing means 11 having the opposed open ends 12 and 13 thereof closed by disc-like end members 14 and 15 which respectively carry valve seat members 16 that project into the tubular member 11 beyond the respective disc members 14 and 15 so as to dispose their valve seats 17 inboard of the respective end members 14 and 15 for a purpose hereinafter described.

A movable valve member 18 is slidingly disposed in the housing means 11 and is operatively interconnected to a piston unit that is generally indicated by the reference numeral 19 so as to be moved thereby in a manner hereinafter described, the piston unit 19 including a pair of opposed piston head assemblies that are generally indicated by the reference numeral 20 and are interconnected together by a rigid guide member 21 as will be apparent hereinafter.

The piston head assemblies 20 sealingly cooperate with the internal peripheral surface 22 of the housing means 11 and end closures 14 and 15 to define end control chambers 23 and 24 therewith and separate the end control chambers 23 and 24 from a main central chamber 25 disposed between the piston head assemblies 20 and containing the main valve member 18 therein.

A portion 26 of the internal peripheral surface 22 of the tubular housing member 11 defines a valve seat that is interrupted by three ports 27, 28 and 29 respectively fluidly interconnected to metallic tubular connectors 30, 31 and 32 while a similar metallic tubular connector 33 is disposed in fluid communication with a port 34 formed in the tubular housing member 11 opposite to the valve seat 26 as illustrated.

A movable valve member 18 is disposed in sliding and sealing engagement with the valve seat 26 and has a surface 35 interrupted by a cavity 36 which is adapted to fluidly and sealingly interconnect the ports 27 and 28 of the valve seat 26 together when the valve member 18 is disposed in the position illustrated in FIG. 1 while the port 29 is permitted to be disposed in fluid communication with the central main chamber 25 of the housing means 11 and, thus, to the tubular connector 33 as illustrated. However, when the valve member 18 is moved to the right in FIG. 1 by the piston unit 19, the cavity 36 of the valve member 18 fluidly and sealingly interconnects the ports 28 and 29 together while permitting the port 27 to be disposed in fluid communication with the main internal chamber 25 of the housing means 11 and, thus, in fluid communication with the tubular connector 33 for a purpose hereinafter described.

The movement of the valve member 18 relative to the housing means 11 is accomplished by directing fluid pressure to either end control chamber 23 or 24 by suitable external pilot valve means (not shown) in a manner well known in the art whereby such fluid pressure is adapted to be directed to either chamber 23 or 24 through the respective valve seat 17 to act on the respective piston head assembly 20 to drive the piston unit 19 away from the pressurized control chamber 23 or 24 while the non-pressurized control chamber 23 and 24 is adapted to be exhausted out through its respective valve seat 17 in a manner well known in the art.

As previously stated, the reversing valve construction 10 of this invention can be adapted to be utilized in a heat pump system wherein a refrigerant compressor (not shown) is adapted to have the inlet side thereof interconnected to the middle tubular connector 31 while its outlet side is interconnected to the upper tubular connector 33. An inside coil of such heat pump system is adapted to have one side thereof interconnected to the tubular connector 30 while the other side of such inside coil is interconnected by an expansion capillary passage to one side of an outside coil that has its other side interconnected to the tubular connector 32 in a manner well known in the art.

Thus, when the valve member 18 of the reversing valve construction 10 of this invention is disposed in the position illustrated in FIG. 1, by means of fluid pressure having been directed into the control chamber 24 while the left hand valve seat 17 exhausted the chamber 23, the heat pump system is acting in a cooling cycle as the hot gas output from the output side of the compressor is being directed through the main chamber 25 of the reversing valve construction 10 by the connector 33 and into the tubular connector 32 and, thus, to the outside coil which then returns the fluid pressure through the expansion capillary passage to the inside coil and through the interconnected ports 27 and 28 of the valve seat 26 to the inlet side of the compressor whereby the inside coil provides its cooling function.

Should it be desired to reverse the heat pump system to a heating cycle thereof, a pilot valve means is actuated in a manner well known in the art so as to direct fluid pressure to the end control chamber 23 through the left hand valve seat 17 while exhausting the end control chamber 24 through the right hand valve seat 17 to cause the piston unit 19 to move the movable valve member 18 to the right in FIG. 1 to now interconnect the ports 28 and 29 together through the cavity 36 of the valve member 18. In this manner, the flow of hot gases from the outlet of the compressor is now directed from the chamber 25 to the port 27 of the valve seat 26 and, thus, to the inside coil which now performs its heating function. The return from the inside coil is directed through the expansion capillary passage to the outside coil and, thus, from the outside coil through the interconnected ports 29 and 28 of the valve seat 26 back to the inlet side of the compressor in a manner well known in the art.

Thus, it can be seen that the reversing valve construction 10 of this invention can be utilized to reverse the cycle of the operation of a heat pump system in the above manner.

Since the particular details of forming the valve seat 26 with its ports 27, 28 and 29 as well as forming the particular valve member 18 of the reversing valve construction 10 is the subject matter of the claimed invention set forth in the copending patent application, Ser. No. 958,030, filed Nov. 6, 1978 now U.S. Pat. No. 4,240,469 issued Dec. 23, 1980, further description of the details of the valve member 18 and its cooperation with the valve seat 26 will not be provided in this application as any information concerning the same can be obtained from the aforementioned copending patent application.

However, as previously set forth, it is a feature of this invention to provide improved sealing of the piston head assemblies 20 of the piston unit 19 with the internal peripheral surface 22 of the housing means 11 and/or provide improved closing of the valve seats 17 with the piston head assemblies 20 and such structure of the piston head assemblies 20 will now be described.

Since each piston head assembly 20 for the piston unit 19 of the reversing valve construction 10 of this invention is substantially identical, only the right hand piston head assembly 20 illustrated in the drawings will be described with the understanding that such description also applies to the left hand piston head assembly 20.

Figure 3:
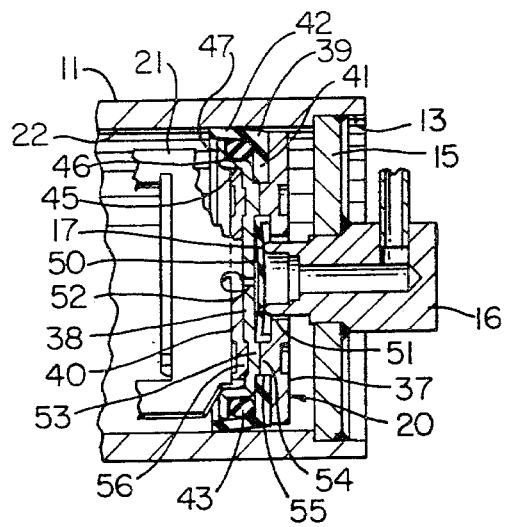
FIG. 3 is a fragmentary cross-sectional view taken on line 3—3 of FIG. 2 and illustrates the respective piston head assembly in its valve seat closing position.
Figure 6:
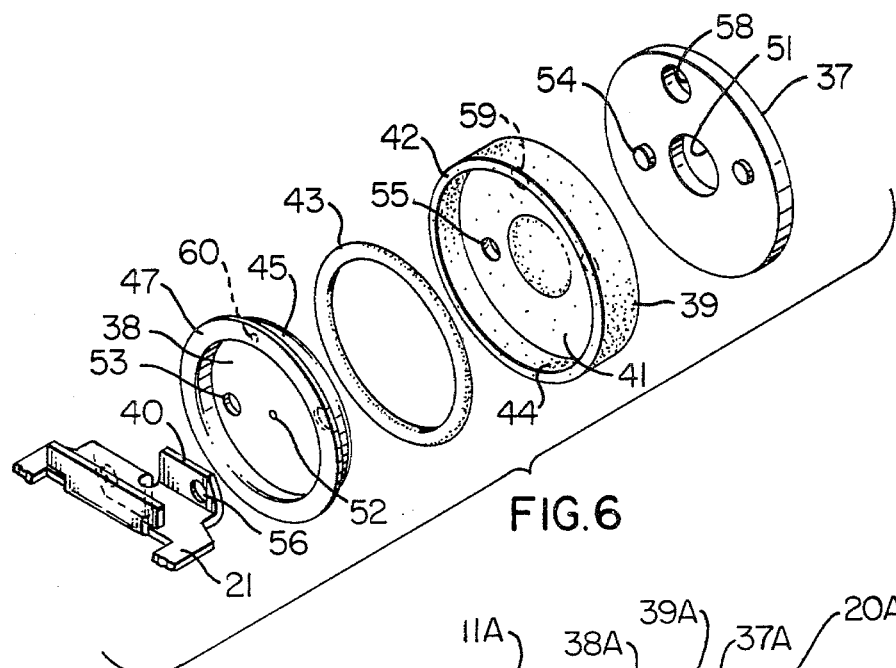
FIG. 6 is an exploded perspective view illustrating the various parts of one of the piston head assemblies for the reversing valve construction of FIG. 1.

As illustrated in FIGS. 3 and 6, each piston head assembly 20 comprises a rigid front disc member 37 and a rigid backing plate 38 securing a flexible seal member 39 therebetween in a manner hereinafter set forth, the guide member 21 of the piston unit 19 having a lug end 40 secured to the respective backing plate 38 in a manner hereinafter described whereby the piston head assembly 20 is secured to and carried by the rigid guide member 21 of the piston unit 19.

Figure 4:
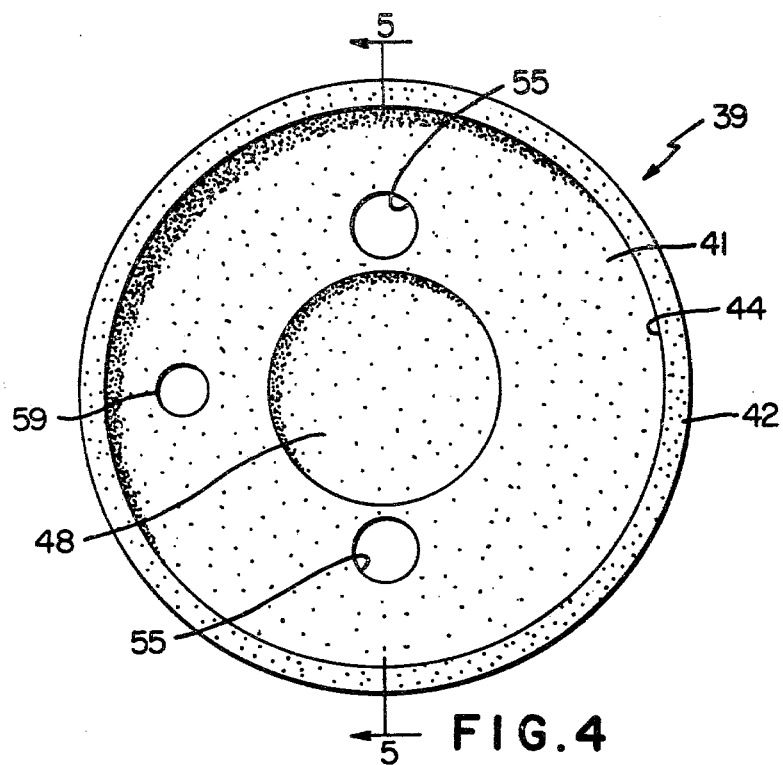
FIG. 4 is an enlarged view of one of the seal members of the piston unit of the reversing valve construction of FIG. 1.
Figure 5:
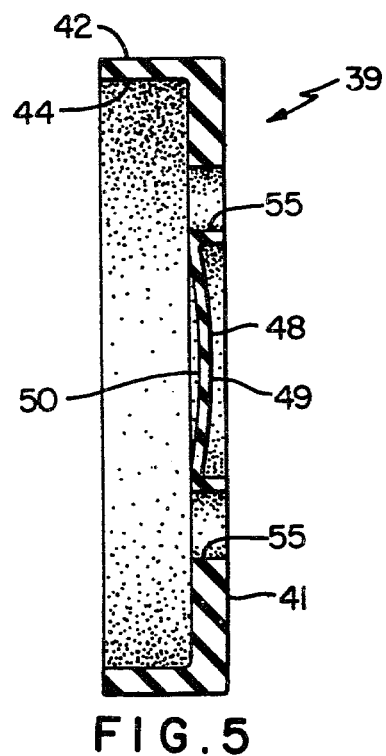
FIG. 5 is a cross-sectional view taken on line 5—5 of FIG. 4.

The flexible seal member 39 for each piston head assembly 20 is best illustrated in FIGS. 4 and 5 and has a disc-like portion 41 joining to an integral peripheral skirt 42 that is adapted to be urged radially outwardly into sliding and sealing engagement with the internal peripheral surface 22 of the tubular housing member 11 by an annular resilient O-ring member 43 disposed in compressed relation between the inside peripheral surface 44 of the flexible skirt 42 and an annular shoulder 45 of the respective rigid backing plate which is defined by an offset portion 46 thereof that fully captures the O-ring seal member 43 between the body portion 41 of the flexible seal member 39 and a peripheral end portion 47 of the rigid backing member 38 as illustrated.

In this manner, it has been found that the compressed annular resilient O-ring member 43 develops an equal force against the peripheral skirt 42 completely radially about the same so that all portions of the flexible skirt 42 are urged into sealing and sliding engagement with the internal peripheral surface 22 of the housing means 11 in a manner not provided by a conventional spider-type metallic spring member that has spaced apart fingers engaging against the flexible skirt to urge the same into such sealing relation. This, it is believed that improved sealing is provided by the O-ring urged skirts 42 of this invention.

The central portion 48 of each seal member 39 is formed in the manner illustrated in FIG. 5 wherein the same is reduced in thickness relative to the remainder of the seal member 39 and is provided with the concave configuration illustrated so that a convex surface 49 thereof faces outwardly and a concave surface 50 thereof will be exposed to the pressure in the main chamber 25 of the reversing valve construction 10 for a purpose hereinafter described.

The front plate 37 for each piston head assembly 20 has a central opening 51 passing therethrough which is adapted to telescopically receive the respective valve seat 17 loosely therethrough in the manner illustrated in FIG. 3 so that the bulged central part 48 of the respective seal members 39 is adapted to engage against the valve seat 17 and close the same as illustrated, the rigid backing plate 38 having a central opening 52 passing therethrough to permit fluid pressure in the main chamber 25 to engage against the concave side 50 of the center part 48 of the respective seal member 39 to urge the same against the valve seat 17 and thereby act as a biasing means therefor in addition to the actual resiliency of the bulged part 48 of the seal member 39 to close the respective valve seat 17.

In this manner, it can be seen that the seal member 39 itself forms the valve member and spring means for closing its valve seat 17 whereas the prior known piston head assemblies each require a separate valve member and a separate spring member therefor for closing a valve seat of the respective end control chamber thereof.

While each seal member 39 can be formed of any suitable material, such as rubber or plastic material, to perform its function in a manner hereinafter set forth, one embodiment thereof has been formed of a fluro-carbon plastic material sold under the trade name of Rulon by the Penn Dixie Company of Bristol, Rhode Island.

While the parts 37, 38, 39 and 40 for each piston head assembly 30 of this invention can be secured together in any suitable manner, the embodiment of the piston head assembly 20 illustrated in the drawings has the parts spot welded together by having mating embossments 53 and 54 on the rigid backing plate 38 and front plate 37 abutting against each other through cooperating openings 55 in the respective seal member 39 as illustrated so that such mating and abutting embossments 53 and 54 can be spot welded together. Likewise, the respective lug end 40 of the guide member 21 of the piston unit 19 can have embossments 56 for mating with the embossments 53 of the backing member 38 so that the same can be spot welded thereto in the stacked relation illustrated in FIG. 3.

Therefore, it can be seen that the piston head assembly 20 of this invention can be formed by the methods of this invention in a simple and effective manner to cause the annular O-ring member 43 to radially engage and urge its respective flexible skirt 42 of its seal member 39 radially outwardly into sliding and sealing engagement with the internal peripheral surface 22 of the tubular housing means 11 while an integral part 48 of the seal member 39 is adapted to open and close an end valve seat 17 of the tubular housing means 11 through a spring action of a bulged part 48 of the seal member 39.

In particular, the reversing valve construction 10 of this invention is adapted to be operated in the manner previously described by having fluid pressure directed to either the right hand valve seat 17 or the left hand valve seat 17 to move the piston unit 19 as the fluid pressure being directed into the end control chamber 23 or 24 and acting on its respective piston head assembly 20 will move the piston unit 19 away therefrom as the other control chamber 23 or 24 is being exhausted through its respective valve seat 17, the flexible skirts 42 of the seal member 39 maintaining sealing engagement with the internal peripheral surface 22 of the housing means 11 during such movement of the piston unit 19 to completely seal the main chamber 25 from the end control chambers 23 and 24 as illustrated.

However, in order to subsequently equalize the pressures between the main chamber 25 and the end control chambers 23 and 24 after the piston unit 19 has been shifted to the desired position thereof and thereby prevent excess pressure forces acting on each piston head assembly 20 during the relatively long time the piston unit 19 remains in such shifted position, each piston head assembly 20 is provided with a bleed orifice means 57 passing therethrough and comprising an opening 58 in the front disc member 37 aligned with an opening 59 in the seal member 39 and a small opening 60 in the rigid packing member 38 as illustrated and in a manner conventional in the art.

Figure 7:
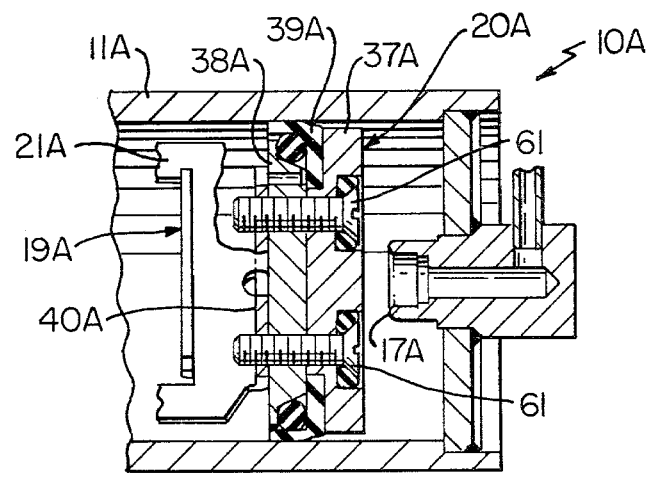
FIG. 7 is a view similar to FIG. 3 and illustrates another embodiment of the reversing valve construction of this invention.

While each piston head assembly 20 previously described has been spot welded together, it is to be understood that any suitable fastening members can be utilized to secure the various parts thereof together and reference is now made to FIG. 7 wherein another embodiment of the reversing valve construction of this invention is generally indicated by the reference numeral 10A and parts thereof similar to the reversing valve construction 10 previously described are indicated by like reference numerals followed by the reference letter "A".

As illustrated in FIG. 7, it can be seen that each piston head assembly 20A is secured together by threaded fastening members 61 that not only interconnect the front plate 37A to the backing plate 38A, but also such threaded fastening members 61 attach to the lug ends 40A of the rigid guide member 21A of the piston unit 19A whereby the seal member 39A is still sandwiched between the front plate 37A and backing member 38A as illustrated to perform its dual function of sealing with the housing means 11A and closing the valve seat 17A.

While the piston head assemblies 20 previously described each utilizes a medial portion 48 of its respective seal member 39 to close an end valve seat 17 of the housing means 11, it is to be understood that other parts of the seal member 39 can be utilized to close a control chamber valve seat if desired.

Figure 8:
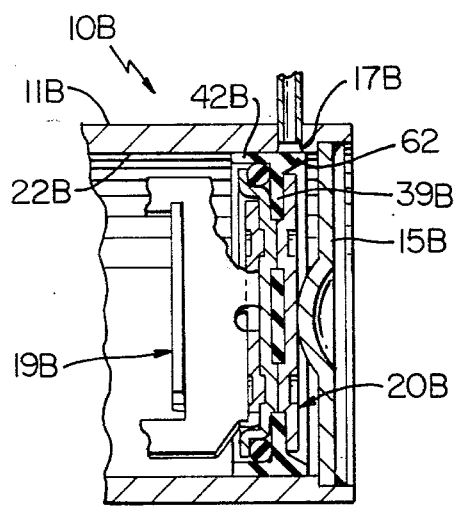
FIG. 8 is a view similar to FIG. 3 and illustrates another embodiment of the reversing valve construction of this invention.

For example, reference is now made to FIG. 8 wherein another reversing valve construction of this invention is generally indicated by the reference numeral 10B and parts thereof similar to the reversing valve construction 10 previously described are indicated by like reference numerals followed by the reference letter "B".

As illustrated in FIG. 8, the tubular housing means 11B has its valve seat 17B formed through the internal peripheral surface 22B thereof and not projecting inwardly from the end closure 15B thereof.

However, the flexible seal member 39B for the piston head assembly 20B has the flexible integral skirt 42B thereof provided with a forwardly extending flange portion 62 which is adapted to seal against the valve seat 17B when the respective piston head assembly 20B is moved against its end plate 15B by the piston unit 19B in the manner previously described.

Therefore, it can be seen that the seal member 39B of the piston head assembly 20B of this invention still performs the dual function of providing sealing engagement with the internal peripheral surface 22B of the housing means 11B by the biasing force of the annular O-ring member 43B and closing the valve seat means 17B at the respective end of the housing means 11B by the extension 62 of the flexible skirt 42B thereof.

Should it be found that the extension 62 of the flexible skirt 42B of each piston head assembly 20B should be assisted in its valve seat closing action by a biasing means, another O-ring like member can be utilized with the respective piston head assembly to provide such biasing feature.

Figure 9:
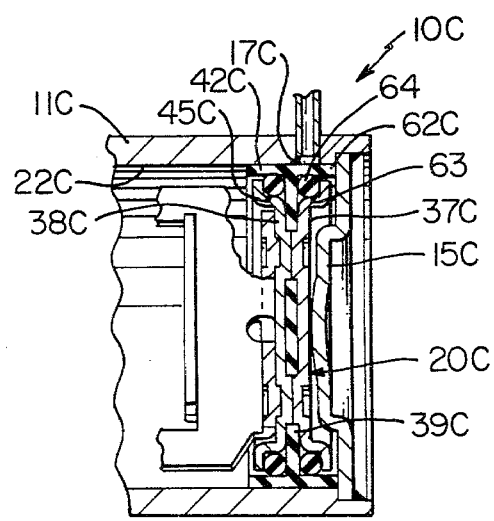
FIG. 9 is a view similar to FIG. 3 and illustrates another embodiment of the reversing valve construction of this invention.

For example, reference is now made to FIG. 9 wherein another reversing valve construction of this invention is generally indicated by the reference numeral 10C and parts thereof similar to the reversing valve constructions 10 and 10B are indicated by like reference numerals followed by the reference letter "C".

As illustrated in FIG. 9, the front plate 37C of the piston head assembly 20C is provided with an offset shoulder 63 in the same manner as the offset shoulder 45C of the backing plate 38C so as to carry a resilient O-ring member 64 thereon to engage against the extension 62C of the flexible skirt 42C of the seal member 39C to urge the same radially outwardly to close the valve seat 17C when the piston head assembly 20C is moved against the end plate 15C in the manner illustrated in FIG. 9.

Therefore, it can be seen that in the operation of the reversing valve construction 10C of FIG. 9, the flexible seal member 39C of each piston head assembly 20C thereof performs the dual function of sealing against the internal peripheral surface 22C of the housing means 11C as well as sealing an end valve seat 17C of the housing means 11C as illustrated.

From the above, it can be seen that this invention not only provides an improved reversing valve construction and method of making the same, but also this invention provides an improved piston head assembly for such a reversing valve construction or the like and a method of making such an improved piston head assembly or the like.

While the forms and methods of this invention now preferred have been illustrated and described as required by the Patent Statute, it is to be understood that other forms and method steps can be utilized and still fall within the scope of the appended claims.

What is claimed is:

1. In a reversing valve construction comprising a housing means having an internal peripheral surface, a movable valve member disposed in said housing means, a piston unit disposed in said housing means and being interconnected to said valve member, said piston unit having opposed piston heads that define a main chamber of said housing means therebetween, said housing means having end portions respectively cooperating with said piston heads to define a pair of control chambers therewith and separated from said main chamber by said piston heads, said end portions respectively having valve seats facing said control chambers in directions substantially transverse to the direction of movement of said piston unit in said housing means, each said piston head having a front disc member and a backing plate, each said piston head having a flexible seal member secured between its respective front disc member and backing plate, each said seal member having an integral peripheral skirt, each said piston head having biasing means urging its respective skirt of its respective seal member into sliding and sealing engagement with said internal peripheral surface of said housing means, the improvement wherein each said biasing means comprises an annular resilient O-ring member separate from its respective seal member and being carried by one of said backing plate and said front disc member of its respective piston head so as to radially engage and urge its respective skirt radially outwardly into said sliding and sealing engagement, each said seal member of its respective piston head being adapted to close its respective valve seat when moved thereagainst by said piston unit.

2. A reversing valve construction as set forth in claim 1 wherein each said valve seat interrupts said internal peripheral surface of said housing means in a direction substantially transverse to the direction of movement of said piston unit in said housing means whereby each said seal member closes its respective valve seat with its said peripheral skirt when moved thereagainst by said piston unit.

3. A reversing valve construction as set forth in claim 2 wherein each said seal member has its respective skirt provided with a first part thereof extending in a certain direction and has a second part extending in the opposite direction, each said second part of its respective seal member being the part thereof that closes its respective valve seat when moved thereagainst by said piston unit.

4. A reversing valve construction as set forth in claim 3 wherein each said O-ring member of its respective seal member engages said first part of its respective skirt.

5. A reversing valve construction as set forth in claim 4 wherein each said piston head includes another O-ring member separate from its respective seal member and acting on its respective second part of its respective skirt to urge the same radially outwardly into said sliding and sealing engagement.

* * * * *